United States Patent
Chmaytelli et al.

(10) Patent No.: US 6,418,311 B1
(45) Date of Patent: Jul. 9, 2002

(54) SEARCH AND REPLACE FEATURES FOR HANDSET PHONEBOOK

(75) Inventors: Mazen Chmaytelli; Samir Khazaka, both of San Diego; Bilhan Kirbas, La Jolla, all of CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/428,670

(22) Filed: Oct. 27, 1999

(51) Int. Cl.⁷ .................................................. H04M 3/00
(52) U.S. Cl. ...................... 455/419; 455/466; 455/414
(58) Field of Search ................................. 455/419, 466, 455/414, 458, 556, 517, 418, 412; 370/389, 349, 259; 340/7.52

(56) References Cited

U.S. PATENT DOCUMENTS

| | | | |
|---|---|---|---|
| 5,896,566 A | * | 4/1999 | Averbuch et al. ............ 455/419 |
| 6,188,909 B1 | * | 2/2001 | Alanara et al. .............. 455/466 |
| 6,259,934 B1 | * | 7/2001 | Guerlin ....................... 455/466 |
| 6,278,885 B1 | * | 8/2001 | Hubbe et al. ................ 455/466 |
| 6,351,636 B2 | * | 2/2002 | Shaffer et al. ............... 455/414 |
| 2001/0011015 A1 | * | 8/2001 | Shaffer et al. ............... 455/414 |

FOREIGN PATENT DOCUMENTS

| | | | |
|---|---|---|---|
| EP | 0 877 531 | 11/1998 | ............ H04Q/7/32 |
| WO | 97/32449 | 9/1997 | ............ H04Q/7/32 |
| WO | 99/29127 | 6/1999 | ............ H04Q/7/22 |

* cited by examiner

*Primary Examiner*—William Trost
*Assistant Examiner*—Rafael Perez-Gutierrez
(74) *Attorney, Agent, or Firm*—Philip R. Wadsworth; Charles D. Brown; Howard H. Seo

(57) ABSTRACT

The system accepts a Short Message System data packet transmitted from a cell site to a mobile station and updates the contents of an address book located in a non-volatile RAM within the mobile station. Upon the occurrence of an event, such as a change in the area code, the system automatically updates the phone book so that a person does not have to perform the tedious task of determining which exchange prefixes within an area code have been affected and then manually updating large numbers of address book entries.

15 Claims, 3 Drawing Sheets

SEARCH AND REPLACE FEATURES FOR HANDSET PHONEBOOK

FIELD OF THE INVENTION

The present invention pertains generally to the field of wireless communications, and more specifically to updating stored data within a wireless communication device.

BACKGROUND

The field of wireless communications has many applications including, e.g., cordless telephones, paging, cellular, wireless local loops, and satellite communication systems. A particularly important application is cellular telephone systems (also including Personal Communications Services (PCS) for mobile subscribers.

Wireless communication devices, such as cellular telephones, are widely used as a replacement for conventional telephone systems. Hereinafter the term cellular will be used to refer to any wireless communication device. In addition to functioning as a replacement for a conventional telephone, wireless communication devices offer the advantage of portability, thus enabling the user to establish a wireless communication link between virtually any two locations on Earth.

In addition to conventional voice communication, wireless communication devices also provide features such as voicemail, voice messaging, and automatic callback notification. Callback notification allows a caller to automatically transmit his telephone number to simplify the process of returning a call. For example, the user of a wireless telephone may place a call that is not received by the intended recipient. A message may be left for the intended recipient and include a "callback number," which corresponds to the caller's mobile identification number. The message recipient may readily establish a communication link with the wireless communication device using the callback number.

Other features, such as three-way calling, are also readily implemented using the conventional communication device. The user of the wireless communication device may establish a first communication link by selecting a stored telephone number from a telephone book storage area within the wireless communication device. When the first communication link is established, the user establishes the second communication link by manually entering a second destination telephone number or by selecting a second destination telephone number from the telephone book storage area.

An additional group of features include directory services, such as a local personal phonebook stored on the communication device. Typical devices allow for the individual entry of user names and telephone numbers stored as a contact entry. The phonebook includes a number of such records. The device accesses the internal phonebook to facilitate automated dialing by reducing the required number of keystrokes.

Telephone numbers often need to be updated. People move, change jobs or otherwise change telephone numbers. Businesses likewise change their telephone numbers. Updating contact data record in a telephone directory can be a tedious manual process. The contact data is updated by navigating a directory to access the particular record. The data to be changed is modified by an appropriate predefined combination of alphanumeric keystrokes.

Recent proliferation of telecommunications devices has seen a significant increase for requests for new telephone numbers. It is not uncommon for a single person/entity to have multiple traditional landlines, wireless telephone, pager and/or fax machines, each requiring its own unique telephone number. Such an increase is steadily exhausting the supply of telephone numbers within given area codes. As a result, additional area codes are being allocated.

Mobile phone users are being faced with the task of updating multiple record entries to reflect changes due to additional area codes. This task may be extremely tedious and frustrating. What is needed is a simple, effective and accurate way to update telephone book record entries when necessary.

SUMMARY OF THE INVENTION

The present invention is directed to a system and method for receiving downloadable update commands from an external source comprising an input device for accepting the update commands, memory for storing data, the data including variable strings, a processor operably connected to said memory and said input device for processing an update command in order to update a first predetermined variable string with a second predetermined variable string identified by the update command. The embodiment of the invention accepts a Short Message System data packet transmitted from a cell site to a mobile station and updates the contents of an address book located in non-volatile RAM within the mobile station. Upon the occurrence of an event, such as a change in the area code, the system automatically updates the phone book so that a person does not have to perform the tedious task of determining which exchange prefixes within an area code have been affected and then manually updating large numbers of address book entries.

The device may further include an option to operate a local global replacement initiated at the mobile station itself.

DETAILED DESCRIPTION OF THE PREFERRED EMBODIMENT

An illustrative implementation of a microprocessor-based telephone system in accordance with the invention is presented here. The illustration uses an automobile cellular phone as an example, but it will be understood by those skilled in the art that the invention can be implemented in virtually any telecommunications system.

Figure 1:
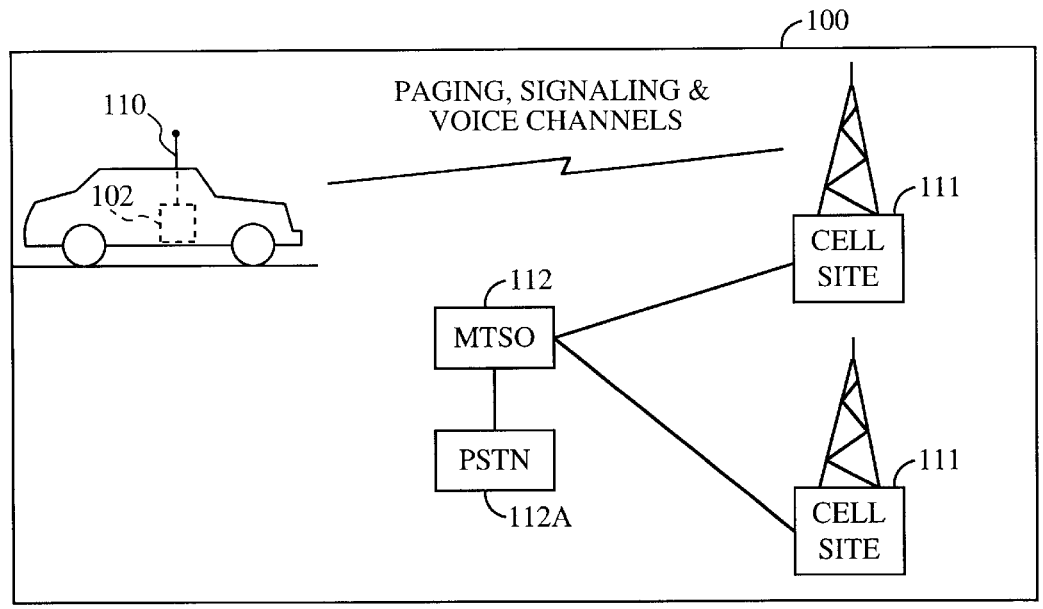
FIG. 1 illustrates a radiotelephone system in which an embodiment of the current invention operates.

FIG. 1 illustrates a typical wireless radiotelephone system 100 including a mobile station 102 having a unique mobile identification number (MID) stored in a suitable location such as an electrically eraseable programmable read-only memory (EEPROM, not shown). Telephone units of this kind are well known in the art and are described here only in sufficient detail to aid understanding the invention. Mobile station 102 communicates with cell site. 111 through antenna 110 via paging, signaling and voice/data channels. Cell site 111 (two are illustrated) communicates to Mobile Terminal Switching Office (MTSO) 112 via a radiolink or landline and then to the Public Switched Telephone Network (PSTN) 112A via a high capacity landline or similar connection.

Such mobile stations are typically hand held devices but historically have been associated with an automobile. However, the embodiments described within refer to any wireless device, whether or not handheld, mobile, fixed in location or any combination thereof.

Figure 2:
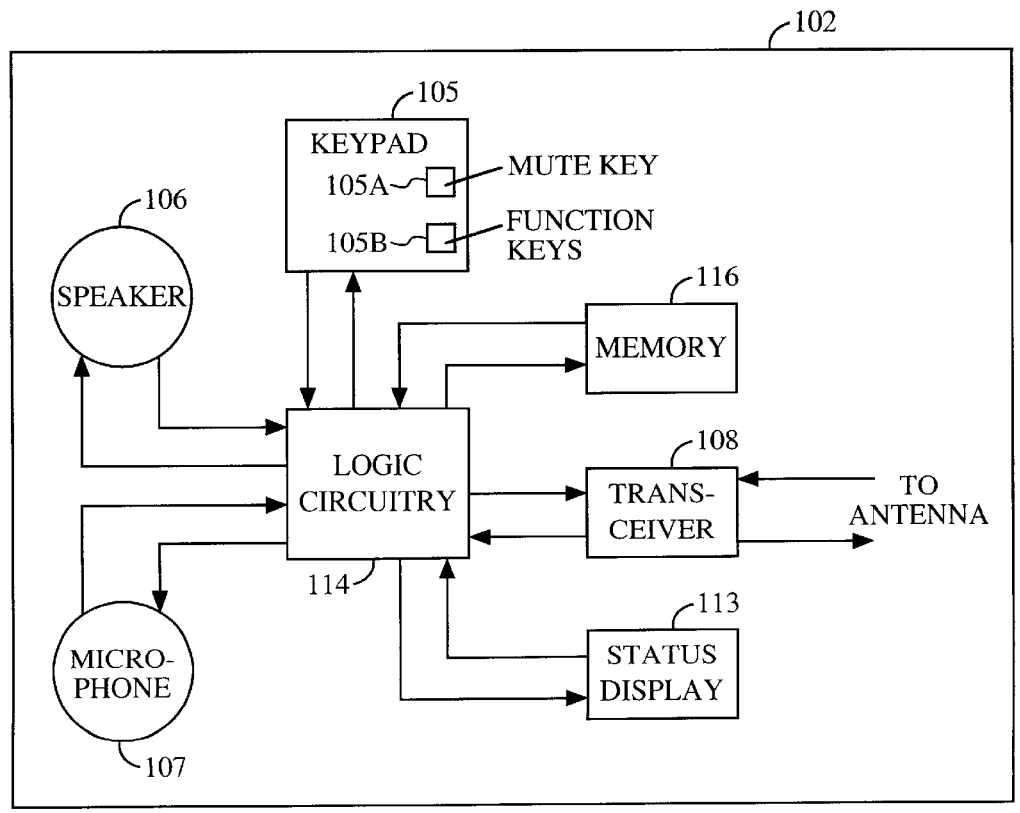
FIG. 2 illustrates a radiotelephone unit in which an embodiment of the current invention operates.

Referring now to FIG. 2, the telephone unit 102 includes a keypad 105 with a mute key 105A and function keys 105B; equivalently, the keypad 105 could be located separately from the handset. Also included in the telephone unit 102 are a speaker 106 and a microphone 107, shown as being mounted within the handset 104 but either or both of which could equivalently be mounted apart from the handset, either separately (e.g., in a telephone operator's headset or in wall mountings), or approximately together (e.g., in a walkie-talkie or speakerphone configuration). The telephone unit 102 further includes a transceiver 108, a status display 113 and a logic circuitry 114. It will be apparent to those of ordinary skill that if the keypad 105, the speaker 106, and the microphone 107 are all located apart from the handset 104, the handset can be dispensed with.

Figure 3:
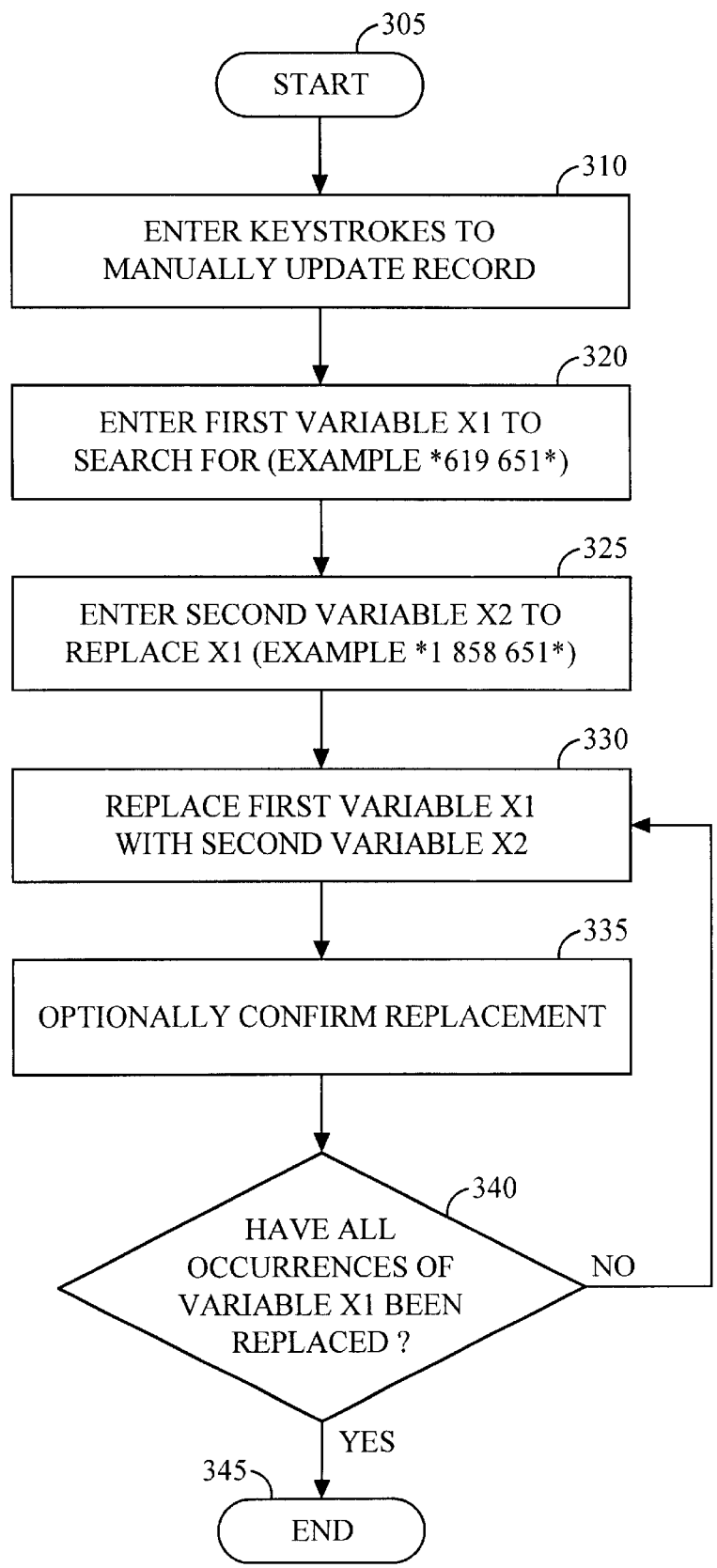
FIG. 3 illustrates in flowchart form a method of operation of an embodiment of the present invention.

FIG. 3 illustrates a manual method for updating records in the telephone directory. The telephone directory is stored in a portion of memory 116. The process begins with step 305. In step 310 a user manually enters the alphanumeric keystrokes used to properly navigate the user interface into phonebook edit mode. When the appropriate record is located, the user manually edits the data to make the appropriate correction. The user may optionally designate the edit as a global replacement. In this embodiment, the user is prompted in step 320 to enter the first variable X1 for which to search. The user is then prompted in step 325 to enter the second variable X2, which is the replacement contents for variable X1.

In step 330 variable X2 is written into memory 116. An optional confirmation dialog box is displayed in step 335 asking for confirmation of the just modified record. If approval is given by depressing the requested confirmation key, then the change is written into memory. Control passes to step 340 where a search for further occurrences of the variable X1 is executed. If a further occurrence is found, control passes to step 330 where the process is repeated. Upon exhaustion of all occurrences of the variable X1, control passes to block 345 where processing terminates and the mobile unit returns to a previous menu in the user interface.

Another embodiment of the present invention utilizes some of the features found in Short Message Service (SMS) (TIA/EIA/IS-637), which is hereby incorporated by reference. A brief overview of Short Message Service will now be discussed.

The Short Message Service (SMS) allows the exchange of short alphanumeric messages between a mobile station and the cellular system and between the cellular system and an external device capable of transmitting and optionally receiving short messages. The external device may be a voice telephone, a data terminal or a short message entry system. This system applies to any device that may be operationally coupled with a voice telephone and/or data terminal.

The Short Message Service consists of message entry features, administration features, and message transmission capabilities. These features are distributed between a cellular system and the SMS message center (MC) which together make up the SMS system (not shown). The MC may be separate from or physically integrated into the cellular system. Short message entry features are provided through interfaces to the MC and the mobile station. Senders use these interfaces to enter short messages, intended destination addresses and various delivery options.

Message Center interfaces optionally include features such as audio response prompts and Dual Tone Multiple Frequency (DTMF) reception for dial in or dedicated terminal access. Mobile Station interfaces may include keyboard and display features to support message entry. Additionally, a cellular voice service subscriber can use normal voice or data features of the mobile station to call an SMS system to enter a message.

An SMS Teleservice can provide the option of specifying priority level, future delivery time, message expiration interval, or one or more of a series of short, predefined messages.

If supported by the Teleservice, the sender can request acknowledgement that the message was received by the mobile station. An SMS recipient, after receiving a short message, can manually acknowledge the message. Optionally, the recipient can specify one of a number of predefined messages to be returned to the sender with the acknowledgement.

SMS administration features include message storage, profile editing, verification of receipt and status inquiry capabilities.

SMS transmission capabilities provide for the transmission of short messages to or from an intended mobile station, and the return of acknowledgments and error messages. These messages and acknowledgments to or from the mobile station are transmitted whether it is idle or engaged in a voice or data call.

The cellular service provider may offer SMS transmission to its cellular voice and data customers only, or may provide an SMS only service without additional data transmission capabilities.

The standard also provides for the broadcast of messages. All available mobile stations on a CDMA paging channel can receive a broadcast message. A broadcast message is not acknowledged by the mobile station. Broadcast Messaging Services may be made available to mobile stations on a CDMA Paging Channel as well as mobile stations in a call on a CDMA Traffic Channel.

Figure 4:
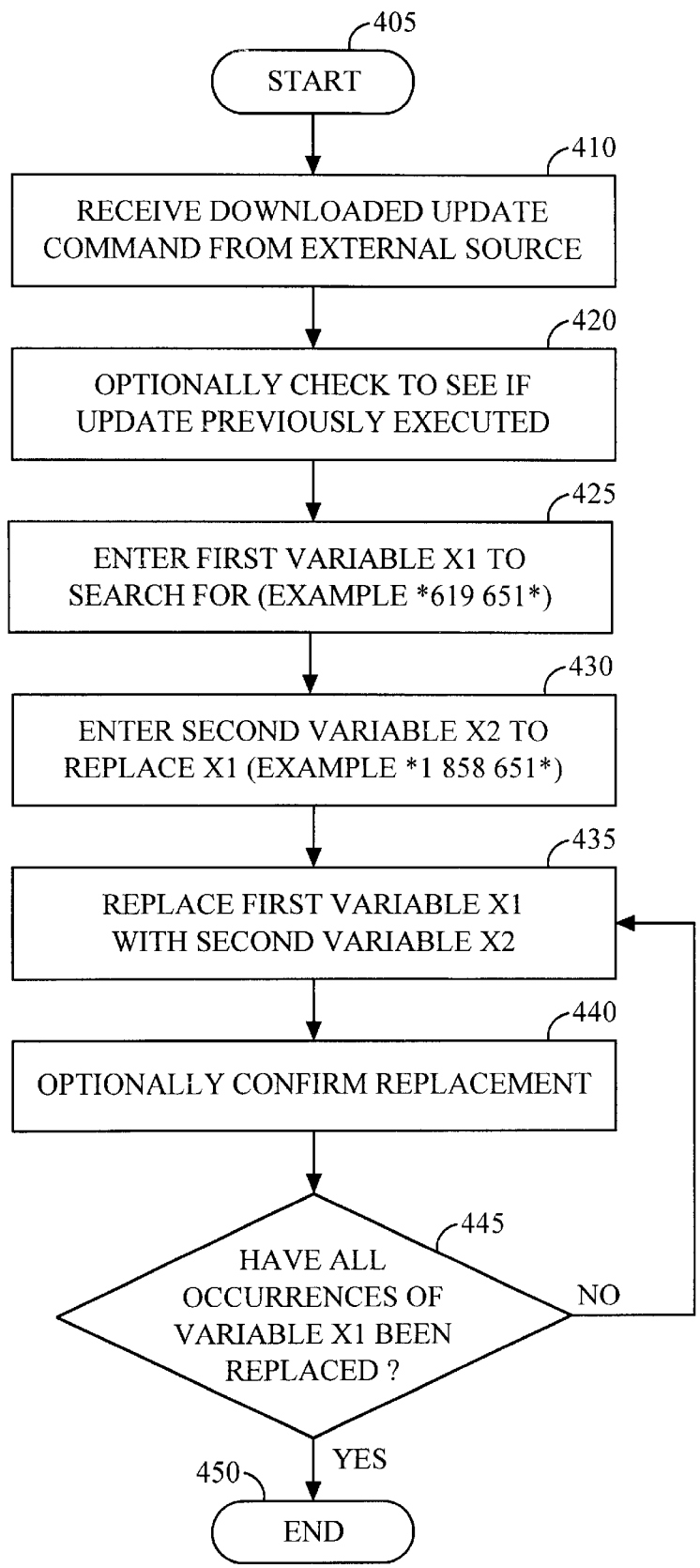
FIG. 4 illustrates in flowchart form an additional method of operation of an embodiment of the present invention.

FIG. 4 illustrates in flowchart format a specific embodiment of the present invention. Block 405 initiates the process at START. In step 410, the mobile station receives a downloaded update command from an external SMS service according to standard TIA/EIA/IS-637. The mobile station optionally checks to see in step 420 if the update has previously been executed in this particular unit. For example, a flag is checked to see if the update has been executed. If the flag has been set, the mobile unit knows not to attempt to make the change. If the flag has not been set, the mobile unit knows to continue the change process. A service provider may continually broadcast updates for a predetermined time frame to allow updating by a mobile unit that may not have been turned recently on within the service area.

In step 425, the mobile unit processor receives a first variable X1 to search for. The variable X1 may include, as an example, area code 619 and exchange prefix 651. Another embodiment would have variable X1 listed as last name of someone who has recently changed his/her last name due to court order or marriage. Another example would include the name of a company or division of a company listed within the directory who has recently undergone a name change due to acquisition, divestiture or corporate re-organization.

In step 430, the processor enters the second variable X2 which is intended to replace X1. Of course, variable X1 and X2 are strings of predetermined length. An example of this is area code 858 and exchange prefix 651. In step 435, variable X2 globally replaces variable X1. In another embodiment, variable X2 may refer to the location of an intended replacement string. In still another embodiment, variables X1 and X2 may define a terminus, such as an Internet Protocol (IP) or other address. Optional Step 440 confirms each replacement either individually or all at once before permanently writing the change to memory. Step 445 checks to see that all occurrences of the string to be replaced have been identified. If not, control is returned to Step 435. If all occurrences have been replaced, then control passes to Step 450, STOP.

It is to be understood that even though various embodiments and advantages of the present invention have been set forth in the foregoing description, the above description is illustrative only, and changes may be made in detail, yet remain within the broad principles of the invention. For example, it should be noted that the claimed invention applies to any device that can update a phonebook directory and is not limited to wireless communication devices Therefore, the present invention is to be limited only by the appended claims.

What is claimed is:

1. A method of updating data stored in a mobile telecommunications device comprising the steps of:
    a) receiving a downloaded update command from an external source;
    b) entering a first variable contained within the update command;
    c) searching for the presence of the first variable stored in a memory within the mobile telecommunication device;
    d) entering a second variable contained within the update command;
    e) repeatedly replacing the first variable with the second variable in the memory;
    f) automatically sending the update commands from the external source to the mobile communication device when the first variable is changed to the second variable.

2. The method of claim 1 further including:
    f) optionally confirming a global replacement of all occurrences of the first variable with the second variable and;
    g) writing the confirmed replacement to memory.

3. The method as in claim 1 wherein step a) further includes:
    a1) receiving a downloaded SMS update command from an external cell site and;
    a2) optionally checking a flag to see if updating has already occurred, and if so, discontinuing the updating.

4. The method of claim 1 further including the steps of:
    f) optionally confirming a single successful replacement and;
    g) writing the confirmed replacement to memory.

5. A system for receiving downloadable update commands from an external source comprising:
    means for receiving a downloaded update command from an external source;
    means for entering a first variable contained within the update command;
    means for searching for the presence of the first variable stored in a memory within a mobile telecommunication device;
    means for entering a second variable contained within the update command;
    means for repeatedly replacing the first variable with the second variable in the memory;
    means for automatically sending the update commands from the external source to the mobile telecommunication device when the first variable is changed to the second variable.

6. A system as in claim 5 further comprising:
    means for receiving a downloaded SMS update command from an external cell site and;
    means for optionally checking a flag to see if updating has already occurred, and if so, discontinuing the updating.

7. A system as in claim 6 further comprising:
    means for optionally confirming one of a global and a single successful replacement and;
    means for writing the confirmed replacements to memory.

8. A system for receiving downloadable update commands from an external source comprising:
    an input device for accepting the update commands;
    memory for storing data, the data including variable strings and;
    a processor operably connected to said memory and said input device for processing an update command in order to update a first predetermined variable string with a second predetermined variable string identified by the update command,
    wherein the external source automatically sends the update commands when the first predetermined variable string is changed to the second predetermined variable string.

9. A system as in claim 8 wherein said first and second predetermined variable strings are numeric.

10. A system as in claim 9 wherein said first and second predetermined variable strings define a terminus.

11. A system as in claim 10 wherein said terminus is defined by a telephone number.

12. A system as in claim 11 wherein said terminus is defined by a terminating address.

13. A system as in claim 8 wherein said memory is an updateable address book.

14. A system as in claim 13 wherein said processor repeatedly performs a search for the first predetermined variable string and thereupon replaces the first variable string with the second variable string.

15. A system as in claim 14 wherein the downloadable update command is of the form found in a Short Messaging System.

* * * * *